United States Patent [19]
Dvorkis et al.

[11] Patent Number: 5,633,489
[45] Date of Patent: May 27, 1997

[54] COMBINATION MOUSE AND SCANNER FOR READING OPTICALLY ENCODED INDICIA

[75] Inventors: Paul Dvorkis, Stony Brook; David Goren, Ronkonkoma, both of N.Y.

[73] Assignee: Symbol Technologies, Inc., Holtsville, N.Y.

[21] Appl. No.: 388,701

[22] Filed: Feb. 14, 1995

Related U.S. Application Data

[62] Division of Ser. No. 310,747, Sep. 22, 1994, Pat. No. 5,508,504, which is a division of Ser. No. 100,220, Aug. 2, 1993, Pat. No. 5,369,262, which is a division of Ser. No. 892,889, Jun. 3, 1992, abandoned.

[51] Int. Cl.$^6$ .................................................. G06K 7/10
[52] U.S. Cl. ............................................ 235/472; 235/462
[58] Field of Search ................................. 235/462, 472, 235/454; 250/227.13, 568; 382/59, 67

[56] References Cited

U.S. PATENT DOCUMENTS

| 4,251,798 | 2/1981 | Swartz et al. | 235/462 |
|---|---|---|---|
| 4,282,425 | 8/1981 | Chadima, Jr. et al. | 235/472 |
| 4,354,102 | 10/1982 | Burns et al. | 235/472 |
| 4,364,035 | 12/1982 | Kirsch | 235/472 |
| 4,387,297 | 6/1983 | Swartz et al. | 235/472 |
| 4,409,470 | 10/1983 | Shepard et al. | 235/472 |
| 4,496,831 | 1/1985 | Swartz et al. | 235/472 |
| 4,521,772 | 6/1985 | Lyon | 235/472 |
| 4,570,057 | 2/1986 | Chadima, Jr. et al. | 235/472 |
| 4,581,761 | 4/1986 | Ichinokawa et al. | 235/472 |
| 4,686,329 | 8/1987 | Joyce | 235/472 |
| 4,767,923 | 8/1988 | Yuasa | 235/472 |
| 4,797,544 | 1/1989 | Montgomery et al. | 250/221 |
| 4,804,949 | 2/1989 | Faulkerson | 235/472 |
| 4,809,351 | 2/1989 | Abromovitz et al. | 382/59 |
| 4,816,660 | 3/1989 | Swartz et al. | 235/472 |
| 4,818,978 | 4/1989 | Kurihara et al. | 235/472 |
| 4,906,843 | 3/1990 | Jones et al. | 235/472 |
| 4,942,621 | 7/1990 | Angwin | 235/472 |
| 4,949,391 | 8/1990 | Faulkerson et al. | 235/472 |
| 4,984,287 | 1/1991 | Massoudi | 235/472 |
| 5,115,227 | 5/1992 | Keiji | 340/709 |
| 5,126,955 | 6/1992 | Tomoda | 235/472 |
| 5,301,243 | 4/1994 | Olschafskie et al. | 235/472 X |
| 5,311,208 | 5/1994 | Burger et al. | 235/472 |
| 5,355,146 | 10/1994 | Chiu et al. | 235/472 |
| 5,448,050 | 9/1995 | Kostizak | 235/472 |

FOREIGN PATENT DOCUMENTS

| 2305461 | 8/1973 | Germany | 235/472 |
|---|---|---|---|
| 2910854 | 1/1980 | Germany | 235/472 |
| 58-127253 | 7/1983 | Japan | 235/472 |
| 0144681 | 6/1990 | Japan | 235/472 |

*Primary Examiner*—Donald T. Hajec
*Assistant Examiner*—Thien Minh Le

[57] ABSTRACT

An optical scanner for reading optically encoded indicia such as a bar code is contained within the same housing as a mouse-type position sensing device. The position sensing portion comprises a track ball extending through a lower opening in the housing and associated movement detection electronics. As the housing is moved by the user across a flat surface, the track ball engages the surface and the associated electronics detect the extent of the movement of the device across the surface. Conveniently located keys allow the user to activate a switch by clicking, and this data along with positional data detected by the track ball electronics is provided as input to an associated computer. The device comprises an optical scanner in the form of a laser beam source, means for oscillating the laser beam so as to produce a scanning beam directed outwardly through a window, and a photodetector for sensing light reflected from a target indicia such as a bar code. The device also comprises a digitizing means for converting the analog signal from the photosensor indicative of the reflectivity of the target indicia into a digital data signal representative thereof. The digital bar pattern is provided to the associated computer along the same transmission means as the positional data.

21 Claims, 1 Drawing Sheet

COMBINATION MOUSE AND SCANNER FOR READING OPTICALLY ENCODED INDICIA

This application is a division of application Ser. No. 08/310,747 filed on Sep. 22, 1994, now U.S. Pat. No. 5,508,504 which is a division of application Ser. No. 08/100,220 filed on Aug. 2, 1993, now U.S. Pat. No. 5,369,262 which is a division of application Ser. No. 07/892,889 filed Jun. 3, 1992, now abandoned.

TECHNICAL FIELD

The instant invention relates to devices for reading optically encoded information, for example bar codes, and to associated data input devices.

BACKGROUND ART

Optically encoded information, such as bar codes, have become quite common. A bar code symbol consists of a series of light and dark regions, typically in the form of rectangles. The widths of the dark regions, the bars, and/or the widths of the light spaces between the bars indicates the encoded information. A specified number and arrangement of these elements represents a character. Standardized encoding schemes specify the arrangements for each character, the acceptable widths and spacings of the elements the number of characters a symbol may contain or whether symbol length is variable, etc.

To decode a bar code symbol and extract a legitimate message, a bar code reader scans the symbol to produce an analog electrical signal representative of the scanned symbol. A variety of scanning devices are known. The scanner could be a wand type reader including an emitter and a detector fixedly mounted in the wand, in which case the user manually moves the wand across the symbol. As the wand passes over the bar code, the emitter and associated optics produce a light spot which impacts on the code, and the detector senses the light reflected back from the light spot passing over each symbol of the code. Alternatively, an optical moving spot scanner scans a light beam, such as a laser beam, across the symbol; and a detector senses reflected light from the beam spot scanned across the symbol. In each case, the detector produces the analog scan signal representing the encoded information.

A digitizer processes the analog signal to produce a pulse signal where the widths and spacings between the pulses correspond to the widths of the bars and the spacings between the bars. The pulse signal from the digitizer is applied to a decoder which first determines the pulse widths and spacings of the signal from the digitizer. The decoder then analyzes the widths and spacings to find and decode a legitimate bar code message. This includes analysis to recognize legitimate characters and sequences, as defined by the appropriate code standard.

Problems arise from association of the optical reader with other devices connected to a common computer system. In actual use, the device for reading optically encoded information typically connects to some form of computer. Often a need exists for entry of other data, in addition to that scanned by the optical reader. For example, in an inventory system using bar code readers the operator scans an item and then enters the quantity of such items presently in stock. Consequently, in most systems using optical readers of the type discussed above, the system will include additional data entry devices coupled to the same computer. Separate data entry devices, however, are often inconvenient to carry along in conjunction with a portable optical reading device. Also, the use of multiple data input devices requires use of several of the option card slots of the computer and additional physical wiring connections. Furthermore, multiple input devices often create software problems directing the multiple data input streams to a single application program running on the computer.

A number of other types of data entry devices are known, and in many applications provide more convenient or "user friendly" data entry operation than do keyboards and alphanumeric displays. For example, a mouse allows a computer operator to move a cursor to point at an option illustrated on a display screen. The operator then "clicks" a button on the mouse to select the particular option. The mouse can also provide graphics data input. U.S. Pat. No. 4,906,843 to Jones et al. discloses a combination mouse and optical scanner, but the optical scanner scans characters or graphics data, not optically encoded information such as bar codes. The user manually scans characters by moving the mouse across the surface on which the characters appear.

From the above discussion it should be clear that a need still exists to further develop various computer input devices integrated with means to scan optically encoded indicia which also provide convenient operation.

DISCLOSURE OF THE INVENTION

It is an objective to incorporate a bar code reader, for example, a moving spot scanner, into a mouse type computer data entry device.

SUMMARY

The present invention incorporates an optical scanner, for reading optically encoded indicia, into a mouse type data input device. This embodiment would include a mouse with relatively standard electronics. The housing of the mouse also contains a moving spot optical scanner module and associated photodetector. The scanner emits a beam of light from the bottom surface of the mouse housing, and the photodetector detects the variable intensity of the returning portion of the light reflected from any object scanned. The photodetector generates an electrical analog signal indicative of the detected variable light intensity. Typically, at least the digitizer for converting analog signals from the photodetector to a pulse signal would also be located within the housing of the mouse. In a first version, a user picks up the mouse and activates a third trigger switch on the top surface of the housing to activate the optical reader. A second version includes a contact switch mounted in the lower surface of the housing. The contact switch detects when the mouse is resting on a surface and controls the device to provide standard mouse type signals to the associated computer. When the operator lifts the mouse off the surface, however, the contact switch triggers operation of the optical reader.

Typically, the light beam emitted by the scanners of the present invention will be in the visible range of the spectrum, for example red light. Consequently, the beam scan across the code or indicia will be visible to the operator. Also, the decode logic can provide a "beep" signal as an audible output upon detection of a valid read result. The visible beam and the "beep" signal provide feedback to the operator as to the operation of the scanner.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BEST MODE FOR CARRYING OUT THE INVENTION

Figure 1A:
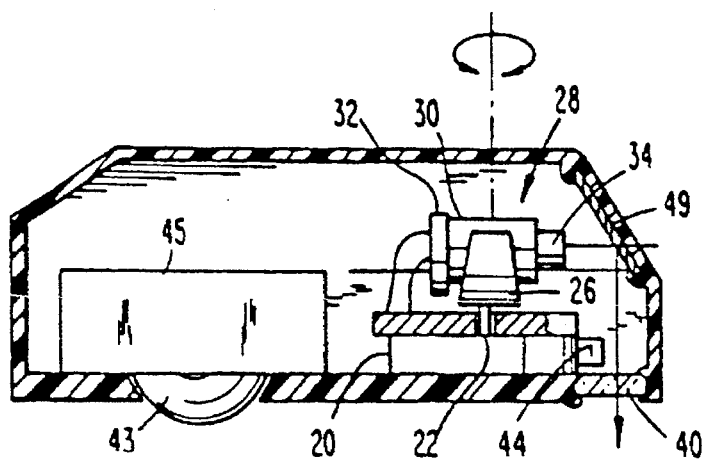
FIG. 1A is a cross sectional view and FIG. 1B is a top plan view of an embodiment of the invention wherein the optical scanner is incorporated into a mouse type input device.

The present invention incorporates the optical scanner, for reading optically encoded indicia, into a mouse type data input device. This embodiment would include a mouse with relatively standard electronics. FIG. 1A, for example, shows a track ball 43 and associated movement detection electronics 45. The housing of the mouse also contains a moving spot optical scanner module and associated photodetector.

Figure 1B:
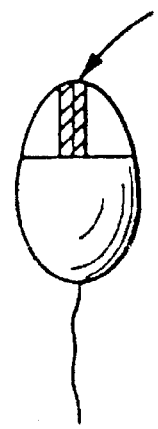

The housing is adapted for grasping, typically in the palm of a user's hand, for manual movement across a flat surface. When located on the flat surface, the track ball extends through an opening in the bottom surface of the housing. During movement of the mouse across the surface, the track ball 43 engages the surface, and the associated electronics 45 detect the extent of the manual movement of the device across the surface. One or two keys are located in the top of the housing (see FIG. 1B). Manual depression of these keys operates switches (not shown) within the mouse housing to provide an operator input. These elements of the embodiment of FIGS. 1A and 1B provide standard "mouse" type inputs to an associated computer.

The mouse arrangement of FIG. 1A comprises a housing containing a lightweight, high-speed, miniature scanning motor 20 similar to that described in U.S. Pat. No. 4,496, 831. The motor 20 repetitively drives an output shaft 22 in alternate circumferential directions about an axis along which the shaft extends over arc lengths less than 360° in each direction. U-shaped structure 26 supports a laser emitter and optics assembly 28. As the motor 20 repetitively drives output shaft 22 in alternate circumferential directions, the subassembly 28 and the support structure 26 jointly oscillate and turn with the shaft 22. The subassembly 28 includes an elongated hollow tube 30, a laser diode 32 fixedly mounted at one axial end region of the tube 30, a lens barrel 34 mounted at the opposite axial end region of the tube 30. The lens barrel contains a focusing lens (not shown) such as a plano-convex lens, but may be spherical, convex or cylindrical.

The solid state laser diode 32, of the subassembly 28, generates an incident laser beam, either in the invisible or visible light range. The lens focuses the laser beam which is reflected off of a mirror 49, and the focused beam passes through the window 40. In this embodiment, the window 40 is formed in the bottom surface of the mouse housing such that the beam cross-section or beam spot will have a certain waist size at distances within a working range relative to the housing. Instead of using the mirror 49, the motor, support and emitter and optics assembly could be positioned to emit light downward through window 40 directly. In either case, during the alternate, repetitive oscillations of the shaft 22, as the support 26 and the subassembly 28 concurrently oscillate, the beam spot sweeps through an arc across the encoded information or bar code symbol positioned a distance below the lower surface of the mouse housing.

The scanner emits a beam of light from the bottom surface of the mouse housing, and the photodetector 44 detects the variable intensity of the returning portion of the reflected light and generates an electrical analog signal indicative of the detected variable light intensity. Typically, at least the digitizer for converting analog signals from the photodetector to a pulse signal would also be located within the housing of the mouse.

The embodiment of FIGS. 1A and 1B includes a third trigger on the mouse to activate the optical reader components (see plan view of FIG. 1B). Typically, the user picks up the mouse, orients it so as to direct the beam along a path toward the information to be scanned, and activates the third trigger switch 42 on the top surface of the housing to activate the moving spot scanner and associated photodetector. When the user has not activated switch 42, the unit operates as a standard computer mouse.

Figure 2:
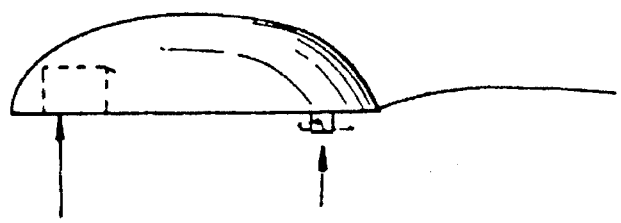
FIG. 2 illustrates an alternate embodiment of the mouse type input device with the incorporate optical scanner.

A second version of the mouse includes a contact switch 42' mounted in the lower surface of the housing, as shown in FIG. 2. The mouse includes the components of an optical reader engine or module 70 similar to the components 20, 26 and 28 discussed above and includes a standard track ball and position detection electronics similar to 43 and 45. The contact switch detects when the mouse is resting on a surface and controls the device to provide standard mouse type signals to the associated computer. When the operator lifts the mouse off the surface, however, the contact switch triggers operation of the optical reader module 70. The operator then points the mouse so that the beam scans across the optically encoded indicia.

In the mouse embodiments illustrated in the drawings, the mouse connects to the associated computer via a cable (FIGS. 1B and 2). This cable could connect to a port on the back of the computer or to a port on the keyboard. The cable supplies all necessary power to the movement detection electronics 45 and any circuitry needed to detect button operation, and it supplies all necessary power to the laser diode 32 and motor 20 of the scanner, the photodetector 44 and the associated electronics for processing the signal from the photodetector. As an alternative, the mouse could incorporate a battery and a wireless transmitter. The transmitter would send analog or digital signals resulting from the scan of the optically encoded information to the associated computer system and the signals relating to the mouse movement and button operation. The battery would supply all power to the mouse for operation of both the mouse type electronics and the optical scanning, detection and signal processing electronics for optical reading of indicia.

Typically, the light beam emitted by the scanners of the present invention will be in the visible range of the spectrum, for example red light. Consequently, the beam scan across the code or indicia will be visible to the operator. The decode logic may reside within the same housing as the scanner, or the decode logic may be software resident in the associated computer system. The decode logic can provide a "beep" signal as an audible output upon detection of a valid read result. The visible beam and the "beep" signal provide feedback to the operator as to the operation of the scanner.

We claim:

1. An apparatus comprising:
   a housing adapted for manual movement across a surface;
   means for engaging the surface, said means for engaging being mounted in the housing and extending from a bottom surface of the housing;
   movement detection electronics associated with said means for engaging for generating a housing movement signal proportional to movement of the housing across the surface;

a light emitter for emitting light through the bottom surface of the housing;

optical scanning means for automatically causing the light from the emitter to scan across a bar code located on an object surface, said bar code comprising bars and spaces;

a photodetector for sensing light reflected from the bar code located on said object surface and producing an electrical signal representative of the bars and spaces comprising said bar code on the object surface; and signal processing means for analyzing the bars and spaces represented by said electrical signal and providing a decoded bar code message.

2. An apparatus as in claim 1, further comprising a switch for activating the light emitter and optical scanning means.

3. An apparatus as in claim 2, where the switch is located on an upper surface of the housing to permit manual activation of the switch by an operator.

4. An apparatus as in claim 2, wherein the switch comprises a contact switch extending from the bottom surface of the housing for detecting whether or not the housing is located on the surface across which the apparatus is manually moved, said contact switch activating the light emitter and optical scanning means when the housing is not located on the surface across which the apparatus is manually moved.

5. An apparatus as in claim 1, further comprising means for selectively transmitting said housing movement signal and said decoded bar code message.

6. An apparatus as in claim 5, wherein said transmitting means comprises a cable for connecting to a port on an associated computer.

7. An apparatus as in claim 6, wherein said cable provides operating power to said movement detection electronics, said light emitter, said optical scanning means, said photodetector, and said digitizer.

8. An apparatus as in claim 5, wherein said transmitting means comprises a wireless transmitter for communicating with an associated computer.

9. An apparatus as in claim 8, further comprising a battery means for providing operating power to said movement detection electronics, said light emitter, said optical scanning means, said photodetector, said digitizer, and said transmitting means.

10. An apparatus comprising:

a housing adapted for manual movement across a surface;

means for engaging the surface, said means for engaging being mounted in the housing and extending from a bottom surface of the housing;

movement detection electronics associated with said means for engaging for generating a housing movement signal proportional to movement of the housing across the surface;

a light emitter for emitting light through the bottom surface of the housing;

optical scanning means for automatically causing the light from the emitter to scan across an object surface;

a photodetector for sensing light reflected from an object surface and producing an electrical signal representative of any optically encoded information formed on the object surface;

a digitizer circuit for converting analog signals from the photodetector to a digital pulse signal corresponding to optically encoded information formed on the object surface;

a decoder for determining pulse widths and spacings of the converted analog signals from the digitizer and for analyzing the determined pulse widths and spacings to find and decode a bar code message; and means for selectively transmitting said housing movement signal and said decoded bar code message to an associated computer.

11. An apparatus as in claim 10, wherein said transmitting means comprises a cable for connecting to a port on an associated computer.

12. An apparatus as in claim 11, wherein said cable provides operating power to said movement detection electronics, said light emitter, said optical scanning means, said photodetector, said digitizer, and said decoder.

13. An apparatus as in claim 10, wherein said transmitting means comprises a wireless transmitter for communicating with an associated computer.

14. An apparatus as in claim 13, further comprising a battery means for providing operating power to said movement detection electronics, said light emitter, said optical scanning mess, said photodetector, said digitizer, said decoder and said transmitting means.

15. An apparatus comprising:

a housing adapted for manual movement across a surface;

means for engaging the surface, said means for engaging being mounted in the housing and extending from a bottom surface of the housing;

movement detection electronics associated with said means for engaging for generating a housing movement signal proportional to movement of the housing across the surface;

bar code reading means for reading a bar code located on the surface and providing a bar code message signal; and means for selectively transmitting said housing movement signal and said bar code message signal to an associated computer.

16. An apparatus as in claim 15, further comprising a decoder, and wherein said bar code message signal transmitted to said associated computer is decoded bar code data provided by said decoder.

17. An apparatus as in claim 15, wherein a decoder is located at said associated computer, and wherein said bar code message signal transmitted to said associated computer is decoded by said decoder at said associated computer.

18. An apparatus as in claim 15, wherein said transmitting means comprises a cable for connecting to a port on an associated computer.

19. An apparatus as in claim 18, wherein said cable provides operating power to said movement detection electronics and said bar code reading means.

20. An apparatus as in claim 15, wherein said transmitting means comprises a wireless transmitter for communicating with an associated computer.

21. An apparatus as in claim 20, further comprising a battery means for providing operating power to said movement detection electronics and said bar code reading means.

* * * * *